US008584805B2

(12) United States Patent
Nelson et al.

(10) Patent No.: US 8,584,805 B2
(45) Date of Patent: Nov. 19, 2013

(54) PERSONALIZED ITEM SORTING AND PACKING RECOMMENDATIONS AT A POINT OF SALE

(75) Inventors: Mark A. Nelson, Poughkeepsie, NY (US); Kevin H. Peters, Germantown, NY (US); Louis R. Ruggiero, Sandy Hook, CT (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 75 days.

(21) Appl. No.: 13/105,433

(22) Filed: May 11, 2011

(65) Prior Publication Data

US 2012/0290424 A1 Nov. 15, 2012

(51) Int. Cl.
*A63F 9/02* (2006.01)

(52) U.S. Cl.
USPC .......................................................... 186/66

(58) Field of Classification Search
None
See application file for complete search history.

(56) References Cited

U.S. PATENT DOCUMENTS

| | | | |
|---|---|---|---|
| 5,125,465 A | 6/1992 | Schneider | |
| 5,437,346 A | 8/1995 | Dumont | |
| 5,952,462 A | 9/1999 | Powell et al. | |
| 6,145,629 A | 11/2000 | Addy | |
| 6,407,436 B1 | 6/2002 | Agnello et al. | |
| 6,513,015 B2 * | 1/2003 | Ogasawara | 705/26.1 |
| 6,550,583 B1 | 4/2003 | Brenhouse | |
| 6,598,791 B2 | 7/2003 | Keys et al. | |
| 6,837,436 B2 | 1/2005 | Swartz et al. | |
| 7,006,389 B2 | 2/2006 | Cordoba | |
| 7,051,943 B2 * | 5/2006 | Leone et al. | 235/462.45 |
| 7,070,097 B2 | 7/2006 | Blanford et al. | |
| 7,110,954 B2 | 9/2006 | Yung et al. | |
| 7,203,486 B2 | 4/2007 | Patel | |
| 7,648,066 B2 * | 1/2010 | Kangas et al. | 235/383 |
| 2003/0004889 A1 | 1/2003 | Fiala et al. | |
| 2004/0133474 A1 * | 7/2004 | Tami et al. | 705/16 |
| 2005/0239033 A1 * | 10/2005 | Hatcher et al. | 434/350 |
| 2007/0163841 A1 * | 7/2007 | Hatcher et al. | 186/66 |
| 2008/0120129 A1 * | 5/2008 | Seubert et al. | 705/1 |
| 2008/0245853 A1 * | 10/2008 | Patrick | 235/375 |
| 2009/0094100 A1 | 4/2009 | Xavier | |
| 2009/0265258 A1 | 10/2009 | Regard | |

OTHER PUBLICATIONS

Garf et al., Transform Your Stores: Enhance Customer Interactions With Advanced Selling Technologies, AMR Research, Jun. 2005, 28 pages.

Biztracker Retailer Point of Sale Software, Biz point-of-sale e-commerce software, Biztracker POS 2003-2009, 35 pages.

(Continued)

*Primary Examiner* — Matthew Gart
*Assistant Examiner* — Michael Maicher
(74) *Attorney, Agent, or Firm* — Schmeiser, Olsen & Watts

(57) ABSTRACT

A method and system for determining a recommendation for packing an item at a point of sale (POS). A preference indicating a maximum bag weight is received at a POS device. The weight of a next item to be packed is determined. Based on the maximum bag weight preference and based on the determined weight of the item, the recommendation for packing the item is determined by selecting a bag from multiple bags that are available to pack items to be purchased by a customer. The bag is selected so that a sum of the weight of the item and a weight of zero or more other items already packed in the bag does not exceed the maximum bag weight preference. The recommendation for packing the item in the selected bag is presented to a user.

6 Claims, 5 Drawing Sheets

(56) References Cited

OTHER PUBLICATIONS

IBM, Motorola and Modiv Media Personal Shopping Support: Putting the point of sale in your customers' hands, IBM Corporation 2008, 4 pages.
Unander et al., Printed touch sensor for interactive packaging and display, IEEE Polytronic 2007 Conference, 1-4244-1186-6/07, IEEE 2007, pp. 12-17.
Marisa McClellan, A grocery store scanner than can identify your apple. [online]. 1 page. [retrieved on May 6, 2011]. Retrieved from the Internet:< URL: http://www.slashfood.com/2008/08/06/a-grocery-store-scanner-than-can-identify-your-apple/>.
iphone: now with bar code reader. [online]. 2 pages. [retrieved on May 6, 2011]. Retrieved from the Internet: < URL: http://www.brandflakesforbreakfast.com/2008/05/iphone-now-with-bar-code-reader.html>.
Karl B., ZXing v1.1: barcode reader for iPhone. 1 page. [retrieved on May 6, 2011]. Retrieved from the Internet: <URL: http://www.qj.net/iphone/homebrew-applications/zxing-v11-barcode-reader-for-iphone.html>.
Joanne Mendes, How to Pack a Grocery Bag. 2 pages. [retrieved on May 6, 2011]. Retrieved from the Internet: <URL: http://www.ehow.com/print/how_2308909—pack-grocery-bag-.html>.
Carol Bengle Gilbert, How to Properly Pack a Grocery Bag. 2 pages. [retrieved on May 6, 2011]. Retrieved from the Internet: <URL: http://www.associatedcontent.com/shared/print.shtml? content_type=article&content_type_id=571799>.

\* cited by examiner

PERSONALIZED ITEM SORTING AND PACKING RECOMMENDATIONS AT A POINT OF SALE

TECHNICAL FIELD

The present invention relates to a data processing method and system for managing sorting and packing items at a point of sale, and more particularly to a technique for providing personalized sorting and packing recommendations at the point of sale.

BACKGROUND

Known methods for sorting and packing groceries include manual processes that are prone to inconsistencies, slowness, broken bags, and/or overweight bags. Other known grocery packing methods are limited by bagging according to a statically determined weight threshold and a spring-based scale measurement of weight. Furthermore, the aforementioned methods fail to account for certain bagging needs of customers, including certain needs that may not be apparent to a cashier or bagger. Thus, there exists a need to overcome at least one of the preceding deficiencies and limitations of the related art.

BRIEF SUMMARY

Embodiments of the present invention provide a method of determining a recommendation for packing an item at a point of sale. The method comprises:

a computer at the point of sale receiving a preference that indicates a maximum weight of one or more items to be packed in any bag a plurality of bags;

the computer determining a weight of the item, wherein the item is included in a plurality of items to be purchased by a customer;

based on the preference that indicates the maximum weight and based on the determined weight of the item, the computer determining the recommendation for packing the item by selecting the bag from the plurality of bags so that a sum of the weight of the item and a weight of zero or more other items packed in the bag does not exceed the maximum weight indicated by the received preference; and the computer presenting the recommendation for packing the item in the selected bag.

A system, program product and a process for supporting computing infrastructure where the process provides at least one support service are also described and claimed herein, where the system, program product and process for supporting computing infrastructure correspond to the aforementioned method.

Embodiments of the present invention provide an integrated packing and bagging system that generates real-time bagging recommendations that are personalized according to preferences of shoppers (e.g., grocery shoppers), so that every point of sale user may become an effective and efficient bag packer.

DETAILED DESCRIPTION

Overview

Embodiments of the present invention may provide a method and system for determining a recommendation for packing an item (e.g., a grocery item that is to be purchased by a customer) at a point of sale (POS). The packing recommendation is based on a preference of a maximum weight of items to be packed in any bag of multiple bags that are available for packing items to be purchased by a customer. The maximum weight preference may be read from a courtesy card that identifies the customer. The packing recommendation indicates that a next item to be packed should be packed in a specific bag selected from the multiple bags so that the weight of item(s) in the specific bag does not exceed the maximum weight preference.

POS System for Personalized Packing Recommendations

Figure 1:
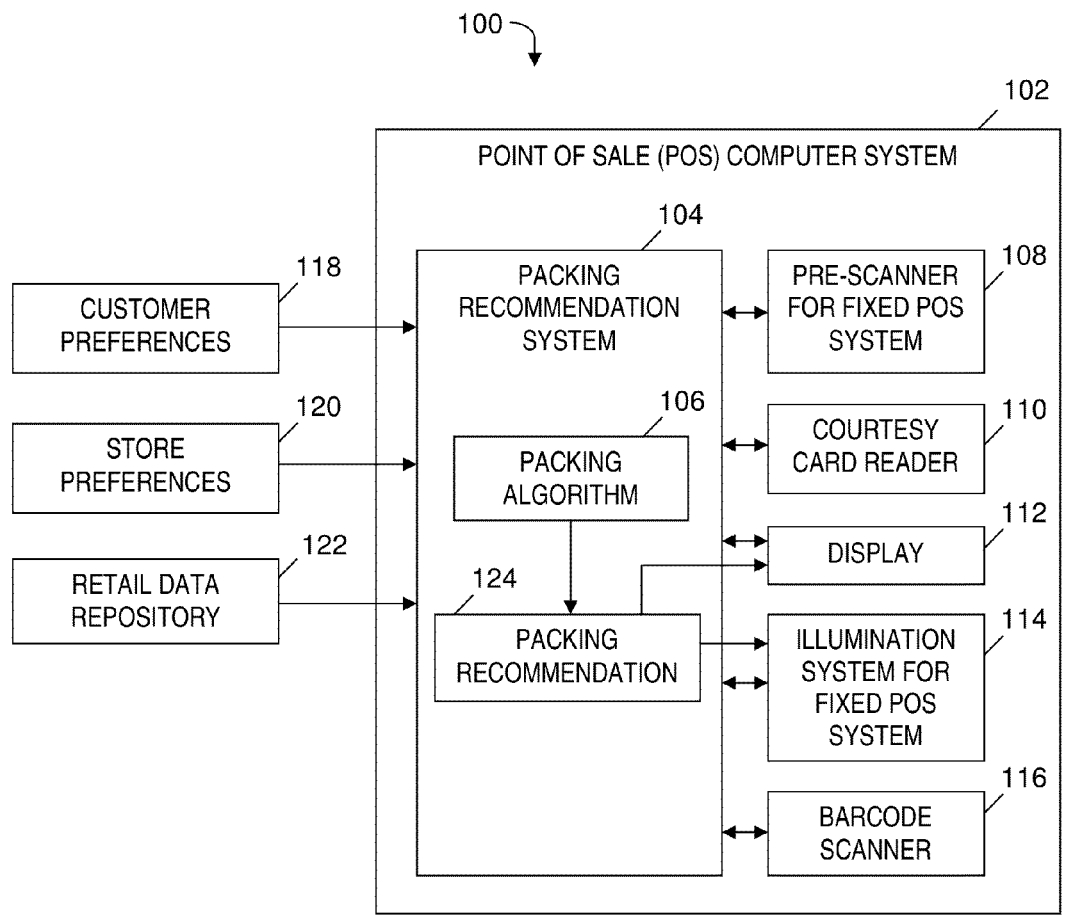
FIG. 1 is a block diagram of a system for determining a recommendation for packing an item at a point of sale, in accordance with embodiments of the present invention.

FIG. 1 is a block diagram of a system for determining a recommendation for packing an item at a point of sale, in accordance with embodiments of the present invention. System 100 includes a computer system 102 that provides functionality at a point of sale. Computer system 102 includes a software-based packing recommendation system 104 that includes code that implements a packing algorithm 106. In one embodiment, computer system 102 is a POS system that is in a fixed location (e.g., a POS system that includes a grocery checkout terminal). Hereinafter, a POS system that is in a fixed location is referred to as a fixed POS device. In another embodiment, computer system 102 is a POS system comprising a mobile, handheld device, and is hereinafter referred to as a handheld POS device.

In an embodiment in which computer system 102 is a fixed POS device, computer system 102 includes a pre-scanner 108 that pre-scans items (e.g., groceries) to be packed prior to the items being scanned to determine their prices. The pre-scanner 108 includes a barcode scanner that scans barcodes on items to be packed in order to identify the items and determine or estimate the weights of each item. Pre-scanner 108 also includes an object recognition system that identifies and determines weights of a subset of the items to be packed where each item in the subset either does not have a barcode or has a barcode that cannot be read by the barcode scanner included in pre-scanner 108. The identification of items and weights of the items determined by pre-scanner 108 are provided to packing recommendation system 104.

Computer system 102 also includes a courtesy card reader 110 that reads a courtesy card provided by a customer (i.e., shopper) who is providing the items to be packed. Reading the courtesy card determines an identity and preferences of the customer, where the preferences include a maximum total weight of item(s) that are to be packed in each bag. Hereinafter, the maximum total weight of item(s) that are to be packed in a bag is also referred to as the maximum bag weight. Courtesy card reader 110 sends the identity and preferences read by the courtesy card reader to packing recommendation system 104. As used herein, a courtesy card is defined as a card that includes a magstripe, barcode, integrated circuit, or other means that stores an identification and preferences of the holder of the card, and that can be read (e.g., scanned) by a POS device to identify and determine the preferences of the holder of the card. A courtesy card is also known as a loyalty card, rewards card, points card, advantage card, or club card.

Further, computer system 102 includes a display 112 that may display recommendations about packing items and other information associated with packing items. Packing recommendation system 104 initiates the aforementioned display of the recommendations and other information associated with packing items.

If computer system 102 is a fixed POS device, then the fixed POS device may include an illumination system 114 that illuminates or otherwise indicates items that are the next items to be packed and that also indicates the specific bags in which the indicated items are to be packed. The packing recommendation system 104 provides the illumination system 114 with an identification of the items that are the next items to be packed and the specific bags in which the next items are to be packed.

Still further, computer system 102 includes a barcode scanner 116 that scans the barcodes on items to be packed, where the scanning of the barcodes determines the prices of the items. For example, barcode scanner 116 scans Universal Product Code (UPC) symbols on the items to be packed. As the barcode scanner 116 scans the barcodes on the items, the weights of items that were determined or estimated by pre-scanner 108 may be updated according to weight information derived from the barcodes. The barcode scanner 116 sends any updated information about the weights of the items to packing recommendation system 104.

Packing recommendation system 104 receives customer preferences 118 and optionally receives store preferences 120 and/or retail data from a retail data repository 122. Packing recommendation system 104 runs packing algorithm 106 to output a packing recommendation 124 based on the customer preferences 118 (and optionally based on store preferences 120 and/or the retail data from repository 122).

The customer preferences 118 include the identity and maximum bag weight preferences of a customer, and are included in the courtesy card that is read by courtesy card reader 110.

Store preferences 120 may include preferences provided by store personnel, which include a default maximum weight of items to be packed in each bag based on the particular bags that the store is currently providing to its customers. For example, the store may switch from a supply of bags from Manufacturer A to a supply of bags from Manufacturer B. Because of the switch in manufacturers, the new supply of bags may not be able to hold as much weight. Therefore, the store may change store preferences 120 to decrease the default maximum weight.

Retail data from retail data repository 122 may include a history of purchases made by the customer, which may indicate brands that are preferred by the customer. Retail data in repository 122 may include an indication that a current sale includes multiples of an item (e.g., 3 of item XYZ for $4.00) and that a customer usually buys multiples of the item when the item is on sale.

Packing recommendation 124 may be presented on display 112 or may be presented by illumination system 114. For example, packing recommendation system may determine that item S is the next item to be packed in Bag 1 and item B is the next item to be packed in Bag 2. In this example, the illumination system 114 directs beams of light to indicate a "1" on item S and a "2" on item B (i.e., to indicate that item S should be packed in Bag 1 and that item B should be packed in Bag 2).

The functionality of the components of system 100 is further described below relative to FIG. 2, FIG. 3 and FIG. 4.

POS Process for Personalized Packing Recommendations

Figure 2:
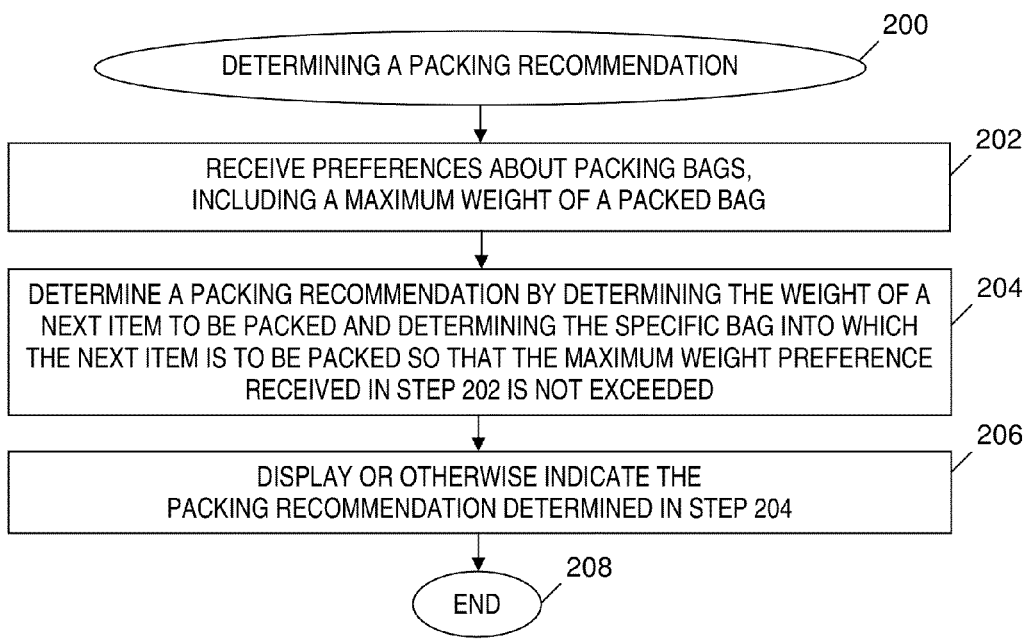
FIG. 2 is a flowchart of a process of determining a recommendation for packing an item at a point of sale, where the process is implemented in the system of FIG. 1, in accordance with embodiments of the present invention.

FIG. 2 is a flowchart of a process of determining a recommendation for packing an item at a point of sale, where the process is implemented in the system of FIG. 1, in accordance with embodiments of the present invention. The process of determining a packing recommendation starts at step 200. In step 202, computer system 102 (see FIG. 1) included in a handheld or fixed POS device receives preferences about packing a single bag or multiple bags that are available for packing items that are to be purchased by a customer. The received preferences include a preference that indicates a maximum weight of any one or more items that are to be packed into the aforementioned single bag or any bag of the aforementioned multiple bags. The received preferences may also include any combination of the following: (1) the type of bag (e.g., paper, plastic, recycle insulated, or no bag) that the customer prefers; (2) an indication that the customer normally uses recycle bags and the number of bags normally used by the customer; and (3) an indication that the customer prefers items in a particular category to be packed in a particular bag (e.g., a preference for fruits and vegetables to be packed in the same bag) or in a particular type of bag (e.g., a preference for meats to be packed in an insulated bag). The preference that indicates the maximum weight and other received preferences may be provided by the customer and/or by the store from which the items are being purchased. Moreover, the preference that indicates a maximum bag weight may include different preferred maximum bag weights corresponding to different types of bags (e.g., Maximum Weight A corresponds to a plastic bag and Maximum Weight B corresponds to a paper bag). A default maximum bag weight preference provided by the store may include different default maximum weights that depend upon different types of bags, where the different types of bags are based on different sources of the bags or different strengths or area densities (e.g., pound ratings) of the same type of bag. As one example, a Default Maximum Weight C corresponds to a plastic bag supplied by Manufacturer ABC and a Default Maximum Weight D corresponds to a plastic bag supplied by Manufacturer XYZ. As another example, a Default Maximum Weight E corresponds to a bag having a pound rating X and Default Maximum Weight F corresponds to a bag having a pound rating Y.

In one embodiment, one or more of the received preferences are received by reader 110 (see FIG. 1) reading data stored on a courtesy card, where the read data indicates the preferences including the maximum bag weight, and identifies the customer who is purchasing the items being packed.

In one embodiment, prior to step 202, computer system 102 (see FIG. 1) receives an identification of the customer, and in step 202, based on the received identification of the customer, the computer system retrieves one or more of the aforementioned preferences (e.g., retrieves preferences from a database that associates customer identifications with corresponding preferences). Receiving the identification of the customer may include reading the identification of the customer stored on a courtesy card, microchip, radio-frequency identification (RFID) tag, or other integrated circuit device, or stored and/or displayed on a smart phone or other computer device. Alternatively, receiving the identification of the customer may include reading or otherwise obtaining a biometric characteristic of the customer and comparing the biometric characteristic to entries in a biometric database.

In one embodiment, computer system 102 (see FIG. 1) receives a default maximum bag weight for a particular bag or a particular type of bag and further receives a maximum weight (a.k.a. customer preferred maximum bag weight) that the customer prefers as the maximum weight of item(s) packed in the particular bag or the particular type of bag. The computer system 102 (see FIG. 1) checks whether the customer preferred maximum bag weight is less than the default maximum bag weight. If the customer preferred maximum bag weight is less than the default maximum bag weight, then computer system 102 (see FIG. 1) sets the maximum bag weight to be the customer preferred maximum bag weight; otherwise, the computer system sets the maximum bag weight to be the default maximum bag weight.

In step 204, the computer system 102 (see FIG. 1) determines a packing recommendation by determining an item is the next item to be packed, determining the weight of the item, and if there are multiple bags rather than a single bag available for packing, determining a specific bag of the aforementioned multiple bags. Prior to step 204, and after step 202, computer system 102 (see FIG. 1) determines the weight of any other items that were previously packed in the aforementioned single bag or multiple bags. When step 204 is performed, the single bag or each of the multiple bags may include zero or more items.

In the packing recommendation determined in step 204, the item determined to be the next item is to be packed in the specific bag so that the maximum weight indicated in the preferences received in step 202 is not exceeded by the sum of the weight of the item and the weight of the zero or more items previously packed in the specific bag. Thus, the packing recommendation determined in step 204 is based on the preference received in step 202 that indicates the maximum bag weight and is further based on the determined weight of the item.

In one embodiment, computer system 102 (see FIG. 1) receives in step 202 a preference (a.k.a. category-based preference) that indicates that any item belonging to a particular category is required to be packed in a particular bag or in a particular type of bag. Subsequently, computer system 102 (see FIG. 1) determines that the next item to be packed belongs to the aforementioned particular category. In this case, the packing recommendation determined in step 204 to pack the next item in a specific bag is also based on the aforementioned category-based category-based preference received in step 202 and further based on the determination that the next item belongs to the particular category.

In step 206, the computer system 102 (see FIG. 1) presents (i.e., displays or otherwise indicates) the packing recommendation determined in step 204. For example, the computer system 102 (see FIG. 1) uses display 112 (see FIG. 1) to display an indication of the item determined to be the next item to be packed in step 204 and/or an indication of the specific bag determined in step 204. As another example, computer system 102 (see FIG. 1) may use illumination system 114 (see FIG. 1) to illuminate the item determined to be the next item to be packed in step 204 with a beam of light that depicts a number, symbol or other visual indicator that indicates the specific bag determined in step 204. Computer system 102 (see FIG. 1) may also generate one or more audible indicators that indicate the item and/or the specific bag determined in step 204.

In step 208, the process of determining a packing recommendation ends.

Although not shown in FIG. 2, one or more preferences received in step 202 may be dynamically updated so that a subsequent performance of the process of FIG. 2 determines a packing recommendation based on the dynamically updated preference(s). For example, a default maximum bag weight of X pounds may be a preference received in step 202 that serves as a basis for determining a first packing recommendation in a first performance of step 204. In this example, the default maximum bag weight is dynamically updated to Y pounds, and a subsequent performance of step 204 (e.g., for a subsequent customer) determines a second, subsequent packing recommendation based on the updated default maximum bag weight being Y pounds pounds instead of X pounds.

Fixed POS Device

Figure 3:
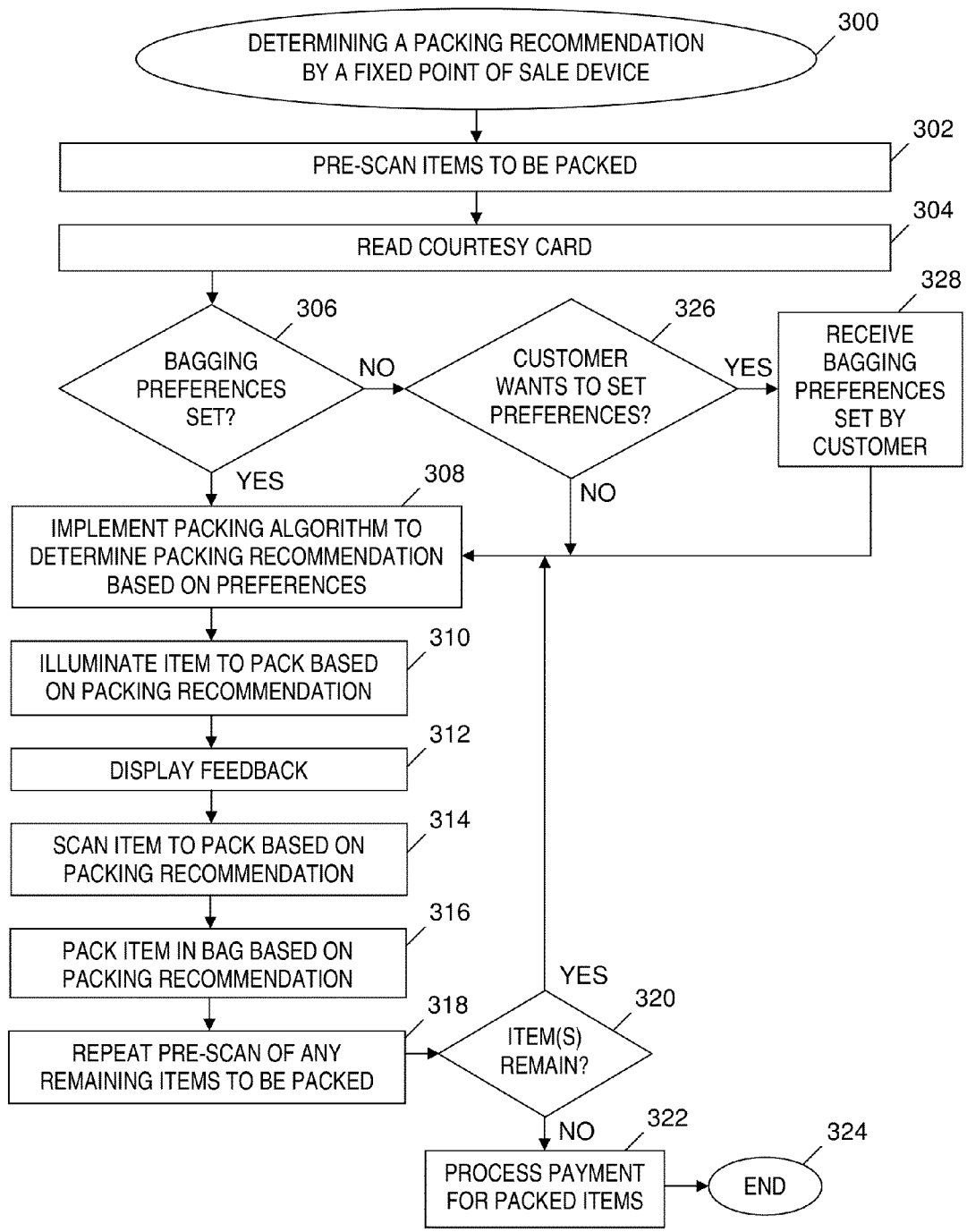
FIG. 3 is a flowchart of a variation of the process of FIG. 2 for a point of sale device that is in a fixed position, in accordance with embodiments of the present invention.

FIG. 3 is a flowchart of a variation of the process of FIG. 2 for a point of sale device that is in a fixed position, in accordance with embodiments of the present invention. In the discussion of FIG. 3 presented below, computer system 102 (see FIG. 1) is included in a fixed POS device. The process of determining a packing recommendation by a fixed POS device starts at step 300, with items to be packed placed in a pre-scan area (e.g., placed on an initial conveyor belt) that can be scanned by pre-scanner 108. In step 302, computer system 102 (see FIG. 1) controls pre-scanner 108 (see FIG. 1) to pre-scan the items to be packed. The pre-scanning includes scanning barcodes affixed to each item of a first set of item(s) that are to be packed. Step 302 also includes computer system 102 (see FIG. 1) determining a second set of item(s) that are to be packed, where the second set and the first set are mutually exclusive, and where each item in the second set either has no barcode or has a barcode that was not able to be read by the pre-scanner 108 (see FIG. 1) (e.g., the barcode was obscured from the pre-scanner). In step 304, computer system 102 (see FIG. 1) reads data included in a courtesy card to obtain an identification of the customer who is going to purchase the items to be packed, and to attempt to obtain preferences of the customer, including a preference indicating a maximum bag weight preferred by the customer. The preferences of the customer may also include the customer's preference for a type of bag (e.g., paper, plastic, recycle, insulated, or no bag); an indication that the customer normally uses recycle bags and the number of bags normally used by the customer; and/or the and/or the customer's preference for items in a particular category to be packed in a particular bag (e.g., meats are to be packed in an insulated bag).

In step 306, computer system 102 (see FIG. 1) determines whether bagging preferences are set by determining if the data read from the courtesy card in step 304 includes a maximum bag weight preferred by the customer and optionally any other bagging preferences. If step 306 determines that bagging preferences have been set, then the Yes branch of step 306 is taken and step 308 is performed.

In step 308 which follows the Yes branch of step 306, packing recommendation system 104 (see FIG. 1) implements packing algorithm 106 (see FIG. 1) to determine a packing recommendation based on preference(s) of the customer, where the preference(s) include a maximum bag weight preferred by the customer and may include other preferences such as a preferred type of bag, a preference for recycle bags, a number of bags normally used, and a preference for packing items of a particular category in a particular bag or in a particular type of bag. If step 308 follows the Yes branch of step 306, then the preference(s) on which the packing recommendation is based were read from the courtesy card in step 304. The packing recommendation determined in step 308 includes an identification of the next item to be packed and an identification of a specific bag selected from multiple bags available to be packed with the items. The packing recommendation includes a recommendation that the identified next item be packed in the specific bag selected from the multiple bags.

In one embodiment, in step 308, the packing recommendation system 104 (see FIG. 1) uses the pre-scan data read in step 302 and the preferences identified in step 304 to identify items to pack in a bag so that (1) the weight of items in the bag does not exceed the maximum bag weight, (2) items of a similar category are packed in the same bag and/or in a particular type of bag, and (3) items having the heaviest weights are packed in the bag first, before lighter weight items.

If a current sale specifies a price for a multiple of a particular item (e.g., 3 of item XYZ for $4.00), then packing recommendation system 104 (see FIG. 1) identifies the sale and uses retail data in repository 122 (see FIG. 1) to determine if the customer usually buys a multiple of the particular item when the item is on sale. If the packing recommendation system identifies the sale and determines that the customer normally buys a multiple of the particular item when the item is on sale, then the packing recommendation system directs pre-scanner 108 (see FIG. 1) to attempt to identify a multiple of the particular item in step 302 and/or step 318 (see below). If a multiple of the particular item is identified by the pre-scanner, then the packing algorithm in step 308 presents a packing recommendation that directs the identified multiple of the particular item to be packed in the same bag.

In step 310, illumination system 114 (see FIG. 1) illuminates the next item to be packed and indicates the specific bag into which the illuminated next item is to be packed. In one embodiment, illumination system 114 (see FIG. 1) directs a beam of light on the identified next item and the beam of light forms a number, symbol or other visual indicator that indicates the specific bag into which the illuminated next item is to be packed.

In step 312, computer system 102 (see FIG. 1) displays feedback on display 112 (see FIG. 1). The feedback displayed in step 312 may include an indication of how close each available bag is to the maximum bag weight. For example, display 112 (see FIG. 1) may include percentages corresponding to the available bags, where a percentage X % corresponding to Bag 1 indicates that the weight of item(s) already packed in Bag 1 is X/100 of the maximum bag weight. Furthermore, the feedback displayed in display 112 (see FIG. 1) may include a message to a user, such as a notification to a cashier that a bag has reached the maximum bag weight and should be removed and replaced with an empty bag, or that packing the next item in a specified bag will make the weight of the bag slightly greater than the maximum bag weight and that the cashier should ask the customer if exceeding the maximum bag weight is acceptable for the specified bag.

Although not shown in FIG. 3, feedback about packing and/or a notification to a user may be displayed on display 112 (see FIG. 1) at a step in the process of FIG. 3 that is other than step 312 (see, e.g., the description of step 314 presented below).

In step 314, barcode scanner 116 (see FIG. 1) scans the item to be packed in the specific bag based on the packing recommendation determined in step 308. If a "wrong" item is picked up and scanned in step 314 (i.e., an item that is not the next item to be packed according to the recommendation determined in step 308), then the packing recommendation system 104 (see FIG. 1) detects that a wrong item has been scanned and determines whether there is a difference in weight between the wrong item and the recommended next item. In response to detecting that a wrong item has been picked up and scanned, the packing recommendation system may (1) allow system may (1) allow the wrong item to be packed in step 316 (see below) without presenting a notification, and make appropriate adjustments when making subsequent packing recommendations in subsequent performances of step 308; or (2) present a notification on display 112 (see FIG. 1) that requests that the item be removed and placed back on the conveyor system so that the recommended next item may be selected and scanned.

In step 316, a bagger packs the item in the specific bag based on the packing recommendation determined in step 308.

In step 318, computer system 102 (see FIG. 1) utilizes pre-scanner 108 (see FIG. 1) to repeat a pre-scan of items remaining in the pre-scan area. That is, the pre-scanner determines whether there are one or more items that have yet to be packed.

In one embodiment, the pre-scanner 108 (see FIG. 1) in step 302 and/or step 318 may be pre-scanning a first one or more items on a conveyor for a first customer while also pre-scanning a second one or more items on the same conveyor for a second customer (i.e., the person who is next line at the POS device after the first customer). In this case, the pre-scanner 108 (see FIG. 1) identifies a barrier that distinguishes a boundary between the first customer's item(s) and the second customer's item(s). By pre-scanning the items of the second customer as they are being placed on the conveyor, the pre-scanner may advantageously detect barcodes before the barcodes are occluded.

In step 320, if pre-scanner 108 (see FIG. 1) determines that no other items remain in the pre-scan area, then the No branch of step 320 is taken and step 322 is performed; otherwise, the Yes branch of step 320 is taken and the process loops back to step 308 to determine packing recommendations for the remaining item(s).

In step 322, computer system 102 (see FIG. 1) processes the payment for the packed items. The process of FIG. 3 ends at step 324.

Returning to step 306, if computer system 102 (see FIG. 1) determines that bagging preferences have not been set, then the No branch of step 306 is taken and step 326 is performed. In step 326, computer system 102 receives an indication about whether or not the customer wants to set bagging preferences. For example, the computer system 102 (see FIG. 1) may display a message to the customer which asks whether or not the customer wants to set bagging preferences, and subsequently the computer system receives a response from the customer about whether the customer wants to set bagging preferences.

If computer system 102 (see FIG. 1) determines in step 326 that that customer wants to set bagging preferences, then the Yes branch of step 326 is taken and step 328 is performed. In step 328, computer system 102 (see FIG. 1) receives bagging preferences set by the customer. The preferences received in step 328 may also include the customer's preference for a type of bag; an indication that the customer normally uses recycle bags and the number of bags normally used by the customer; and/or the customer's preference for items in a particular category to be packed in a particular bag. Step 328 includes receiving a preference that indicates the maximum bag weight. For example, step 328 may include receiving bagging preferences that the customer enters on a keypad that is included in computer system 102 (see FIG. 1). Following step 328, the process continues with step 308, which determines a packing recommendation based on the recommendation based on the preferences received in step 328.

Returning to step 326, if computer system 102 (see FIG. 1) determines that the customer does not want to set bagging preferences, then the No branch of step 326 is taken and the process continues with step 308, which determines a packing recommendation based on default preferences that are predefined (e.g., defined prior to the start of the process of FIG. 3) and stored in computer system 102 (see FIG. 1). The default preferences include a default maximum bag weight.

In an alternate embodiment, only a single bag is available for packing the customer's items (instead of the aforementioned multiple bags) and the process of FIG. 3 identifies the preferred maximum bag weight and may also identify a customer's preference for a type of bag in step 304 or step 328. In this case, the packing recommendation system 104 (see FIG. 1) determines packing recommendations based on the preferences (see step 308) to ensure that items packed in the single bag do not exceed the maximum bag weight.

Handheld POS Device

Figure 4:
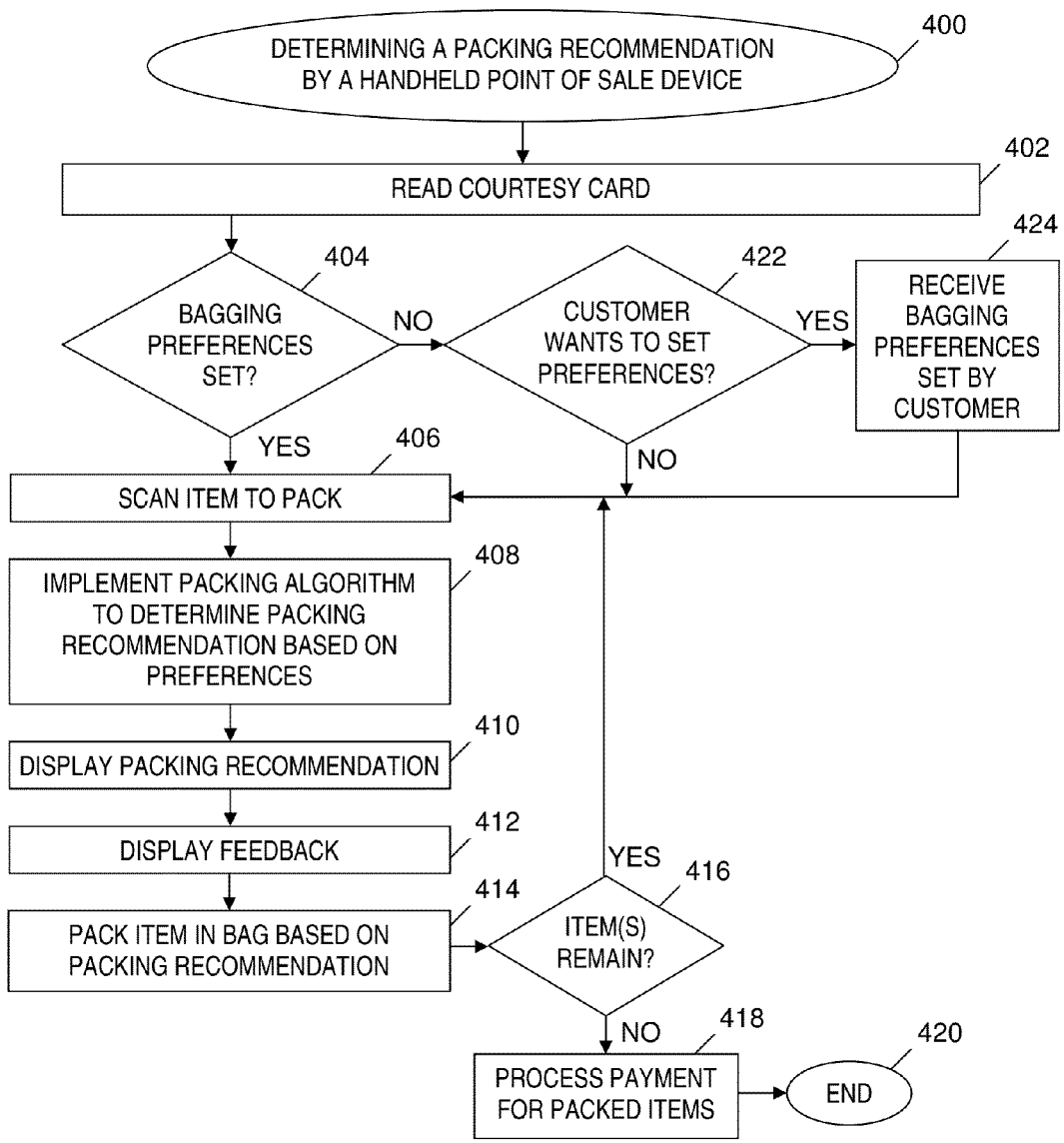
FIG. 4 is a flowchart of a variation of the process of FIG. 2 for a handheld point of sale device, in accordance with embodiments of the present invention.

FIG. 4 is a flowchart of a variation of the process of FIG. 2 for a handheld point of sale device, in accordance with embodiments of the present invention. In the discussion of FIG. 4 presented below, computer system 102 (see FIG. 1) is included in a handheld POS device. The process of determining a packing recommendation by a handheld POS device starts at step 400. In step 402, computer system 102 (see FIG. 1) reads data included in a courtesy card to obtain an identification of the customer who is going to purchase the items to be packed, and to attempt to attempt to obtain preferences of the customer, including a preference indicating a maximum bag weight preferred by the customer. The preferences of the customer may also include the customer's preference for a type of bag (e.g., paper, plastic, recycle, insulated, or no bag); an indication that the customer normally uses recycle bags and the number of bags normally used by the customer; and/or the customer's preference for items in a particular category to be packed in a particular bag or in a particular type of bag (e.g., meats are to be packed in an insulated bag).

In step 404, computer system 102 (see FIG. 1) determines whether bagging preferences are set by determining if the data read from the courtesy card in step 402 includes a maximum bag weight preferred by the customer and optionally any other bagging preferences. If step 404 determines that bagging preferences have been set, then the Yes branch of step 404 is taken and step 406 is performed.

In step 406, barcode scanner 116 (see FIG. 1) operated by the customer scans a next item to be packed.

In step 408, which follows the Yes branch of step 404 and step 406, packing recommendation system 104 (see FIG. 1) implements packing algorithm 106 (see FIG. 1) to determine a packing recommendation based on preference(s) of the customer, where the preference(s) include a maximum bag weight preferred by the customer. If step 408 follows the Yes branch of step 404 and step 406, then the preference(s) on which the packing recommendation is based were read from the courtesy card in step 402. The packing recommendation determined in step 408 includes an identification of a specific bag selected from the multiple bags that are available to be packed with the items to be purchased by the customer. The packing recommendation indicates that the item scanned in step 406 is to be packed in the specific bag so that the weight of item(s) packed in the specific bag does not exceed the maximum bag weight preference.

In one embodiment, in step 408 the packing recommendation system 104 (see FIG. 1) identifies one or more delicate items that were already packed in a bag according to a preference for items of a specific category to be packed in the bag, identifies a next item to be packed in the bag, and presents a warning to the customer that there is potential of crushing or otherwise damaging the already packed delicate item(s) if the identified next item is packed in the bag. The warning may advise the customer to take the delicate item(s) out of the bag, pack the identified next item in the bag, and then re-pack the delicate item(s) in the bag.

In step 410, computer system 102 (see FIG. 1) displays the packing recommendation on display 112 (see FIG. 1). The customer views display 112 (see FIG. 1) to determine which bag to pack the item scanned in step 406.

In step 412, computer system 102 (see FIG. 1) displays feedback on display 112 (see FIG. 1). The feedback displayed in step 412 may include an indication of how close each available bag is to the maximum bag weight. For example, display 112 (see FIG. 1) may include percentages corresponding to the available bags, where a percentage X % corresponding to Bag 1 indicates that the weight of item(s) already packed in Bag 1 is X/100 of the maximum bag weight. Furthermore, the feedback displayed in display 112 (see FIG. 1) may include a message to the customer, such as a notification to the customer that a bag has reached the maximum bag weight, or that packing the next item in a specified bag will make the weight of the bag slightly greater the bag slightly greater than the maximum bag weight.

Although not shown in FIG. 4, feedback about packing and/or a notification to a user may be displayed on display 112 (see FIG. 1) at a step in the process of FIG. 4 that is other than step 412.

In step 414, the customer packs the item in the specific bag based on the packing recommendation determined in step 408 and displayed in step 410.

In step 416, computer system 102 (see FIG. 1) receives an indication from the customer whether or not one or more other items remain to be scanned and packed. If step 416 receives an indication that no other items remain to be scanned and packed, then the No branch of step 416 is taken and step 418 is performed; otherwise, the Yes branch of step 416 is taken and the process loops back to step 406 to determine packing recommendation(s) for the remaining item(s).

In step 418, computer system 102 (see FIG. 1) processes the payment for the packed items. The process of FIG. 4 ends at step 420.

Returning to step 404, if computer system 102 (see FIG. 1) determines that bagging preferences have not been set, then the No branch of step 404 is taken and step 422 is performed. In step 422, computer system 102 receives an indication about whether or not the customer wants to set bagging preferences. For example, the computer system 102 (see FIG. 1) may display a message to the customer which asks whether or not the customer wants to set bagging preferences, and subsequently the computer system receives a response from the customer about whether the customer wants to set bagging preferences.

If computer system 102 (see FIG. 1) determines in step 422 that that customer wants to set bagging preferences, then the Yes branch of step 422 is taken and step 424 is performed. In step 424, computer system 102 (see FIG. 1) receives bagging preferences set by the customer. Step 424 includes receiving a preference that indicates the maximum bag weight. The preferences received in step 424 may also include the customer's preference for a type of bag; an indication that the customer normally uses recycle bags and the number of bags normally used by the customer; and/or the customer's preference for items in a particular category to be packed in a particular bag or in a particular type of bag. For example, step 424 may include receiving bagging preferences that the customer enters on a keypad that is included in computer system 102 (see FIG. 1). Following step 424, the process continues with step 406 and then step 408, which determines a packing recommendation based on the preferences received in step 424.

Returning to step 422, if computer system 102 (see FIG. 1) determines that the customer does not want to set bagging preferences, then the No branch of step 422 is taken and the process continues with step 406 and then step 408, which determines a packing recommendation based on default preferences that are pre-defined (e.g., defined prior to the start of the process of FIG. 3) and stored in computer system 102 (see FIG. 1). The default preferences include a default maximum bag weight.

In an alternate embodiment, only a single bag is available for packing the customer's items (instead of the aforementioned multiple bags) and the process of FIG. 4 identifies the preferred maximum bag weight and may also identify a customer's preference for a type of bag in step 402 or step 424. In this case, the packing recommendation system 104 (see FIG. 1) determines packing recommendations based on the preferences (see step 408) to ensure that items packed in the single bag do not exceed the maximum bag weight.

Computer System

Figure 5:
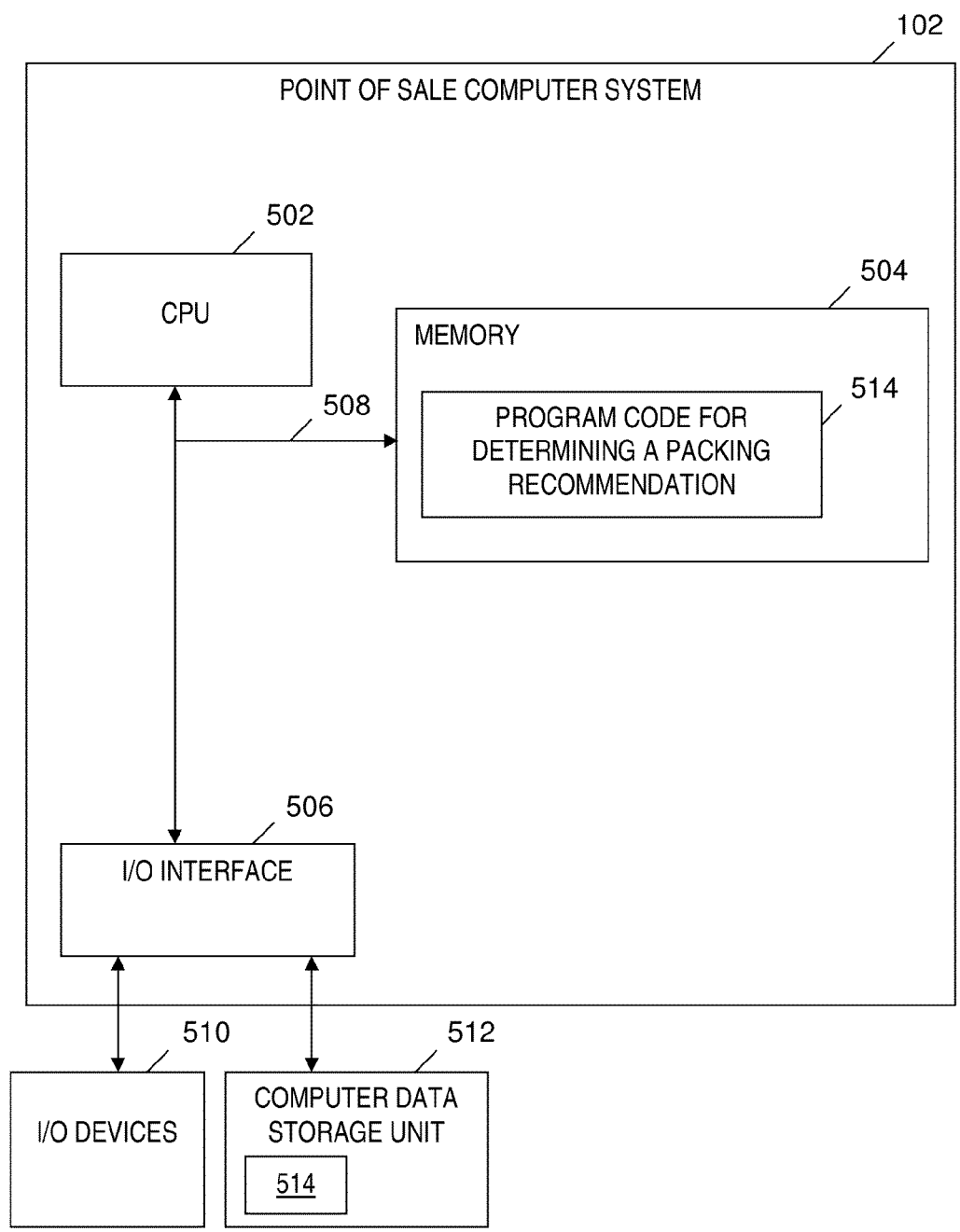
FIG. 5 is a block diagram of a computer system that is included in the system of FIG. 1 and that implements one or more of the processes of FIG. 2, FIG. 3 and FIG. 4, in accordance with embodiments of the present invention.

FIG. 5 is a block diagram of a computer system that is included in the system of FIG. 1 and that implements one or more of the processes of FIG. 2, FIG. 3 and FIG. 4, in accordance with embodiments of the present invention. Computer system 102 generally comprises a central processing unit (CPU) 502, a memory 504, an input/output (I/O) interface 506, and a bus 508. Further, computer system 102 is coupled to I/O devices 510 and a computer data storage unit 512. CPU 502 performs computation and control functions of computer system 102, including carrying out instructions included in program code 514 to perform a method of determining a packing recommendation, where the instructions are carried out by CPU 502 via memory 504. CPU 502 may comprise a single processing unit, or be distributed across one or more processing units in one or more locations (e.g., on a client and server).

Memory 504 may comprise any known computer-readable storage medium, which is described below. In one embodiment, cache memory elements of memory 504 provide temporary storage of at least some program code (e.g., program code 514) in order to reduce the number of times code must be retrieved from bulk storage while instructions of the program code are carried out. Moreover, similar to CPU 502, memory 504 may reside at a single physical location, comprising one or more types of data storage, or be distributed across a plurality of physical systems in various forms. Further, memory 504 can include data distributed across, for example, a local area network (LAN) or a wide area network (WAN).

I/O interface 506 comprises any system for exchanging information to or from an external source. I/O devices 510 comprise any known type of external device, including a display device (e.g., monitor), keyboard, mouse, printer, speakers, handheld device, facsimile, etc. Bus 508 provides a communication link between each of the components in computer system 102, and may comprise any type of transmission link, including electrical, optical, wireless, etc.

I/O interface 506 also allows computer system 102 to store information (e.g., data or program instructions such as program code 514) on and retrieve the information from computer data storage unit 512 or another computer data storage unit (not shown). Computer data storage unit 512 may comprise any known computer-readable storage medium, which is described below. For example, computer data storage unit 512 may be a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are carried out by CPU 502 via memory 504 to determine a packing recommendation. Although FIG. 5 depicts memory 504 as including program code 514, the present invention contemplates embodiments in which memory 504 does not include all of code 514 simultaneously, but instead at one time includes only a portion of code 514.

Further, memory 504 may include other systems not shown in FIG. 5, such as an operating system (e.g., Linux) that runs on CPU 502 and provides control of various components within and/or connected to computer system 102.

Storage unit 512 and/or one or more other computer data storage units (not shown) that are coupled to computer system 102 may store default preferences, such a default maximum bag weight.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 504 and/or computer data storage unit 512) having computer-readable program code (e.g., program code 514) embodied or stored thereon.

Any combination of one or more computer-readable mediums (e.g., memory 504 and computer data storage unit 512) may be utilized. The computer readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 514) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 514) embodied on a computer-readable medium may be transmitted using any appropriate medium, including but not limited to wireless, wireline, optical fiber cable, RF, etc., or any suitable combination of the foregoing.

Computer program code (e.g., program code 514) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 5. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3 and FIG. 4) and/or block diagrams of methods, apparatus (systems) (e.g., FIG. 1 and FIG. 5), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 514). These computer program instructions may be provided to one or more hardware processors (e.g., CPU 502) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 504 or computer data storage unit 512) that can direct a computer (e.g., computer system 102), other programmable data processing apparatus, or other devices to function in a particular manner, such that the instructions (e.g., program 514) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 514) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to determining a packing recommendation. Thus, an embodiment of the present invention discloses a process for supporting computer infrastructure, wherein the process comprises providing at least one support service for at least one of integrating, hosting, maintaining and deploying computer-readable code (e.g., program code 514) in a computer system system (e.g., computer system 102) comprising one or more processors (e.g., CPU 502), wherein the processor(s) carry out instructions contained in the code causing the computer system to determine a packing recommendation.

In another embodiment, the invention provides a method that performs the process steps of the invention on a subscription, advertising and/or fee basis. That is, a service provider, such as a Solution Integrator, can offer to create, maintain, support, etc. a process of determining a packing recommendation. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3 and FIG. 4 and the block diagrams in FIG. 1 and FIG. 5 illustrate the architecture, functionality, and operation of possible implementations of systems, methods, and computer program products according to various embodiments of the present invention. In this regard, each block in the flowchart or block diagrams may represent a module, segment, or portion of code (e.g., program code 514), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of determining a recommendation for packing an item at a point of sale, said method comprising:
   a computer at said point of sale receiving a preference that indicates a maximum weight of one or more items to be packed in a bag of a plurality of bags;
   said computer determining a weight of said item, said item included in a plurality of items to be purchased by a customer;
   based on said preference that indicates said maximum weight and based on said determined weight of said item, said computer determining said recommendation for packing said item by selecting said bag from said plurality of bags so that a sum of said weight of said item and a weight of zero or more other items packed in said bag does not exceed said maximum weight indicated by said received preference;

said computer presenting said recommendation for packing said item in said selected bag;

said computer pre-scanning one or more barcodes affixed to a first set of one or more items of said plurality of items to be purchased by said customer, wherein said pre-scanning is performed prior to a scanning of said one or more barcodes affixed to said first set of one or more items to determine an amount to pay for said first set of one or more items, and wherein said computer is included in a point of sale device that is in a fixed position;

said computer determining a first set of one or more weights of said first set of one or more items based on said pre-scanned one or more barcodes;

said computer attempting and failing to pre-scan one or more barcodes affixed to a second set of one or more items of said plurality of items, wherein said first and second sets of one or more items are mutually exclusive, wherein said attempting and failing to pre-scan is performed prior to a scanning of said one or more barcodes affixed to said second set of one or more items to determine an amount to pay for said second set of one or more items;

said computer generating an image that includes said second set of one or more items of said plurality of items;

said computer performing object recognition on said generated image to determine a second set of one or more weights of said second set of one or more items of said plurality of items, wherein said weight of said item is included in said first set of one or more weights or said second set of one or more weights; and said computer selecting said item from said plurality of items as a next item to be packed based on said determined weight of said item and based on said determined first and second sets of one or more weights.

2. The method of claim 1, further comprising said computer determining said weight of said item is greater than or equal to any other weight of said first and second sets of one or more weights, wherein said selecting said item from said plurality of items is based on said determined weight of said item being greater than or equal to any other weight of said first and second sets of one or more weights.

3. The method of claim 1, wherein said presenting said recommendation for packing said item in said selected bag includes: illuminating said item in response to said determining said recommendation for packing said item; and presenting an indication of said selected bag into which said item is to be packed.

4. A computer system comprising:
a central processing unit (CPU);
a memory coupled to said CPU;
a computer-readable, tangible storage device coupled to said CPU, said storage device containing instructions that are carried out by said CPU via said memory to implement a method of determining a recommendation for packing an item at a point of sale, said method comprising:
    said computer system at said point of sale receiving a preference that indicates a maximum weight of one or more items to be packed in any bag a plurality of bags;
    said computer system determining a weight of said item, said item included in a plurality of items to be purchased by a customer; based on said preference that indicates said maximum weight and based on said determined weight of said item, said computer system determining said recommendation for packing said item by selecting said bag from said plurality of bags so that a sum of said weight of said item and a weight of zero or more other items packed in said bag does not exceed said maximum weight indicated by said received preference; and
    said computer system presenting said recommendation for packing said item in said selected bag;
    said computer system pre-scanning one or more barcodes affixed to a first set of one or more items of said plurality of items to be purchased by said customer, wherein said pre-scanning is performed prior to a scanning of said one or more barcodes affixed to said first set of one or more items to determine an amount to pay for said first set of one or more items, and wherein said computer system is included in a point of sale device that is in a fixed position;
    said computer system determining a first set of one or more weights of said first set of one or more items based on said pre-scanned one or more barcodes; said computer system attempting and failing to pre-scan one or more barcodes affixed to a second set of one or more items of said plurality of items, wherein said first and second sets of one or more items are mutually exclusive, wherein said attempting and failing to pre-scan is performed prior to a scanning of said one or more barcodes affixed to said second set of one or more items to determine an amount to pay for said second set of one or more items;
    said computer system generating an image that includes said second set of one or more items of said plurality of items;
    said computer system performing object recognition on said generated image to determine a second set of one or more weights of said second set of one or more items of said plurality of items, wherein said weight of said item is included in said first set of one or more weights or said second set of one or more weights; and
    said computer system selecting said item from said plurality of items as a next item to be packed based on said determined weight of said item and based on said determined first and second sets of one or more weights.

5. The computer system of claim 4, wherein said presenting said recommendation for packing said item in said selected bag includes:
    said computer system illuminating said item in response to said determining said recommendation for packing said item; and
    said computer system presenting an indication of said selected bag into which said item is to be packed.

6. A computer program product, comprising a computer-readable, tangible storage device having a computer-readable program code stored therein, said computer-readable program code containing instructions that are carried out by a processor of a computer system to implement a method of determining a recommendation for packing an item at a point of sale, said method comprising:
    said computer system at said point of sale receiving a preference that indicates a maximum weight of one or more items to be packed in a bag of a plurality of bags;
    said computer system determining a weight of said item, said item included in a plurality of items to be purchased by a customer;

based on said preference that indicates said maximum weight and based on said determined weight of said item, said computer system determining said recommendation for packing said item by selecting said bag from said plurality of bags so that a sum of said weight of said item and a weight of zero or more other items packed in said bag does not exceed said maximum weight indicated by said received preference; and said computer system presenting said recommendation for packing said item in said selected bag;

said computer system pre-scanning one or more barcodes affixed to a first set of one or more items of said plurality of items to be purchased by said customer, wherein said pre-scanning is performed prior to a scanning of said one or more barcodes affixed to said first set of one or more items to determine an amount to pay for said first set of one or more items, and wherein said computer system is included in a point of sale device that is in a fixed position;

said computer system determining a first set of one or more weights of said first set of one or more items based on said pre-scanned one or more barcodes;

said computer system attempting and failing to pre-scan one or more barcodes affixed to a second set of one or more items of said plurality of items, wherein said first and second sets of one or more items are mutually exclusive, wherein said attempting and failing to pre-scan is performed prior to a scanning of said one or more barcodes affixed to said second set of one or more items to determine an amount to pay for said second set of one or more items;

said computer system generating an image that includes said second set of one or more items of said plurality of items;

said computer system performing object recognition on said generated image to determine a second set of one or more weights of said second set of one or more items of said plurality of items, wherein said weight of said item is included in said first set of one or more weights or said second set of one or more weights; and said computer system selecting said item from said plurality of items as a next item to be packed based on said determined weight of said item and based on said determined first and second sets of one or more weights.

* * * * *